ADRIANCE & BROWN.
Grain Platform for Harvesters.

No. 99,617.  Patented Feb. 8, 1870.

Witnesses  Inventors

UNITED STATES PATENT OFFICE.

JOHN P. ADRIANCE AND THOMAS S. BROWN, OF POUGHKEEPSIE, N. Y.

GRAIN-PLATFORM FOR HARVESTERS.

Specification forming part of Letters Patent No. 99,617, dated February 8, 1870.

*To all whom it may concern:*

Be it known that we, JOHN P. ADRIANCE and THOMAS S. BROWN, of Poughkeepsie, county of Dutchess, State of New York, have invented certain new and useful Improvements in Grain-Platforms of Harvesters, of which the following is a full, clear, and exact description, reference being had to the accompanying drawings, making a part of this specification, in which—

Figure 1:
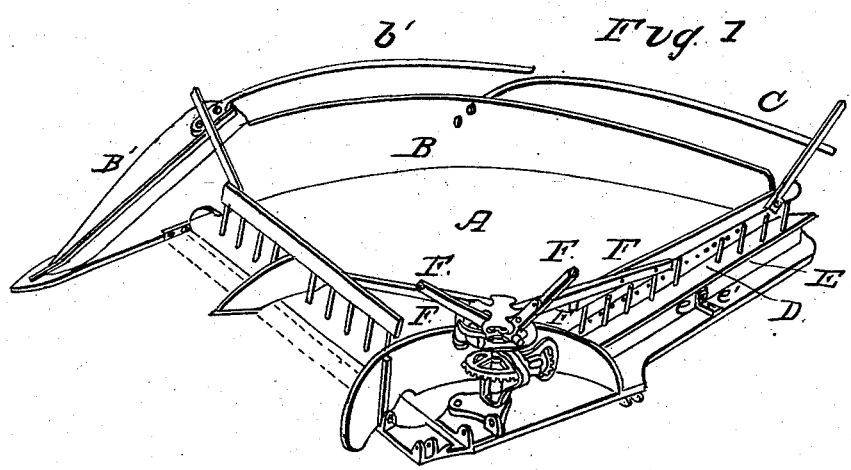
Figure 2:
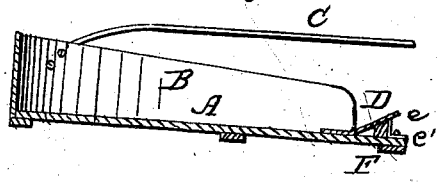

Figure 1 is a perspective view of a platform having our improvements applied; and Fig. 2 is a sectional view through line $x\,y$, Fig. 1.

The first part of our invention relates to the construction of a reaping-machine provided with a sweep-rake of the class known as the "Johnston rake," in which the rake is lifted bodily from a horizontal to a vertical, or nearly vertical, position; and consists in the combination, with this rake, of a platform provided with a hinged supplemental platform or apron, such apron being attached to the rear part of the main platform, the object of this part of our invention being twofold—first, to enable the rake to carry the grain farther out of the way of the machine on the next bout, and also to lay the grain in a more compact gavel, both of which ends are attained by lifting it higher above the stubble at the instant of discharge than can be done with the ordinary construction of platform. The second point gained by this feature of construction is that it assists the cam in lifting the rakes from a horizontal to a perpendicular, or nearly perpendicular, position, thereby reducing the amount of power required to lift the rake, first, by allowing a more gradual rise in the cam-track at the point traversed by the rake after leaving the platform; and, secondly, by starting the rake in its upward motion by means of its longer arm, instead of by the shorter arm at its heel.

The second part of our invention relates to the combination, with an ordinary harvester grain-platform, of a guard rail or finger extending around the rear portion of said platform—that is to say, commencing at or near the termination of the guard-rail as now applied, (and which serves merely as a divider to prevent the standing grain from becoming entangled with the cut grain and the rakes,) and continuing to the extreme rear corner of the platform, this rail serving to keep the overhanging heads of the grain from contact with the stubble, and thereby being doubled back and spread out like a fan when laid in the gavel.

In the machines heretofore used there has been one of two constructions employed—either an outer rim of the desired height, and, of course, very heavy, or else a rail extending around the entire outer arc of the platform, and terminating at its rear end in a switch or latch, or else supported by a standard mounted upon the platform. Now, either of these forms of rails will answer one of the ends for which they were designed—that is, to furnish a support for the outer end of the rake-head; but they are nearly entirely worthless so far as assisting to deliver the grain is concerned—first, because they entangle the grain at the point of delivery, from the fact that they are closed at their rear end, and, of course, all the straw which happens to fall between the rail and rim must be doubled back upon itself before it can escape; and, next, because such portion as happens to fall below the guard-rail when being swept toward the rear of the platform by the first rake acting as a reel-arm must lie there with the heads dragging over the stubble, until enough shall have accumulated to form a gavel.

Other objections to the employment of the single rail may be found in the fact of the weight which is required, and the consequent loss of elasticity involved, all of which imperfections are remedied in the construction which we have invented.

In the drawing, A is the main platform, constructed in any ordinary manner, and provided with the usual rim B, divider B', and divider-rail or finger $b$. C is a second guard-rail, attached to the outer rim of the platform, commencing at or near the terminus of the divider-rail $b$, and extending around to the rear of the platform on a line parallel, or nearly parallel, with the platform, and at a short distance above the rim B. D is an apron hinged to the rear end of the main platform A, and made adjustable by means of the rib E, which is secured in any desired position by means of the angle-iron $e$, slotted for the reception of the set-screw or bolt $e'$.

The rake which we prefer to use with this platform and apron is the revolving rake of the Johnston class, (represented in the drawings,) in which the arms F are elevated from their horizontal position by means of a cam-track, F', and the point at which said rake-arms are lifted from the platform may be varied by rotating the cam upon its axis.

The operation of our platform is as follows: Having decided upon the height at which we wish to deliver the gavel, and having adjusted the apron D properly by means of rib E, we next adjust the point at which the rakes are lifted from the platform, this being accomplished by turning the cam-track F' around until the path described by the rake-teeth shall correspond with the inclination of apron D, when, upon the rake being put in motion, the grain will be delivered in compact gavels, and without having been straggled by coming in contact with the stubble, and without any wrenching or straining of parts arising from the rake having been made to conform to the changed outline of the platform.

As the grain is swept across the platform by the rake, there is a constant tendency after it passes about the center, to spread out like a fan, thrusting the heads over the rim, when they drag over the stubble and are delivered in the gavel in bad shape; but by the use of the guard-rail C, the grain is confined within suitable limits, and the operation of the rake rendered much more perfect. In case a single rod fails to confine the grain perfectly, more than one may be employed.

Having now described our invention, what we claim as new, and desire to secure by Letters Patent, is—

1. The combination, substantially as set forth, of the following elements in a harvester, namely: a quadrant platform, an adjustable apron attached to said platform at its rear or discharging end, and a sweep-rake, which moves about a perpendicular, or nearly perpendicular, axis.

2. In combination with the platform of a harvesting-machine, a rear or second guard-rail, C, supported at one end only, arranged and operating substantially as set forth.

3. The combination of a quadrant platform, an adjustable apron, and a rear or second guard-rail, all arranged and operating substantially as set forth.

JOHN P. ADRIANCE.
T. S. BROWN.

Witnesses:
EGBERT Q. ELDRIDGE,
ROBT. N. PALMER.